US009244665B1

(12) United States Patent
Boulos et al.

(10) Patent No.: US 9,244,665 B1
(45) Date of Patent: Jan. 26, 2016

(54) OPTIMIZED EXECUTION OF DYNAMIC LANGUAGES

(71) Applicant: Google Inc., Mountain View, CA (US)

(72) Inventors: Solomon Boulos, San Francisco, CA (US); Jeremy Sugerman, Palo-Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/334,610

(22) Filed: Jul. 17, 2014

(51) Int. Cl.
*G06F 9/45* (2006.01)
(52) U.S. Cl.
CPC ..................................... *G06F 8/443* (2013.01)
(58) Field of Classification Search
USPC .......................................................... 717/153
See application file for complete search history.

(56) References Cited

U.S. PATENT DOCUMENTS

| | | | |
|---|---|---|---|
| 5,530,964 A | 6/1996 | Alpert et al. | |
| 5,999,732 A * | 12/1999 | Bak ..................... | G06F 9/45516 717/118 |
| 6,651,248 B1 * | 11/2003 | Alpern .................... | G06F 9/443 712/E9.084 |
| 7,389,317 B2 | 6/2008 | Guttag et al. | |
| 7,437,718 B2 * | 10/2008 | Fournet ................. | G06F 21/577 717/133 |
| 7,917,898 B2 * | 3/2011 | Zhao ........................ | G06F 9/541 717/136 |
| 8,095,507 B2 | 1/2012 | Wu et al. | |
| 8,244,775 B1 * | 8/2012 | Bak .......................... | G06F 8/315 707/756 |
| 8,392,881 B1 * | 3/2013 | Lund et al. ..................... | 717/116 |
| 9,104,449 B2 * | 8/2015 | Boulos ................ | G06F 9/45508 |
| 2005/0204361 A1 * | 9/2005 | Heeb ....................... | G06F 8/443 719/315 |
| 2006/0085400 A1 * | 4/2006 | Minore ..................... | G06F 8/20 |
| 2006/0242654 A1 * | 10/2006 | Lund ..................... | G06F 9/4431 719/331 |
| 2006/0294528 A1 * | 12/2006 | Lund ....................... | G06F 8/443 719/328 |
| 2009/0307430 A1 | 12/2009 | Bruening et al. | |
| 2010/0083219 A1 * | 4/2010 | Tavares ................. | G06F 9/4428 717/107 |
| 2011/0131556 A1 * | 6/2011 | Tatsubori .................. | G06F 8/30 717/137 |
| 2011/0145423 A1 * | 6/2011 | Burns ................... | H04L 69/165 709/228 |
| 2011/0179347 A1 | 7/2011 | Proctor et al. | |
| 2011/0321010 A1 * | 12/2011 | Wang ............................. | 717/116 |
| 2013/0159978 A1 | 6/2013 | Jazdzewski et al. | |
| 2013/0339936 A1 | 12/2013 | Boulos | |
| 2014/0007060 A1 | 1/2014 | Warren et al. | |
| 2014/0173556 A1 | 6/2014 | Robatmili et al. | |

OTHER PUBLICATIONS

Madhukar, et al., "Improved type specialization for dynamic scripting languages," ACM Sigplan Notices, Feb. 2014, vol. 49, No. 2, pp. 37-48.

* cited by examiner

*Primary Examiner* — Marina Lee
(74) *Attorney, Agent, or Firm* — McDermott Will & Emery LLP

(57) ABSTRACT

In one aspect, a method for optimizing execution of dynamic language code is provided, the method includes identifying a first dynamic language function call during runtime, the function call including argument values for one or more arguments of the function, calculating a type signature for the one or more argument values of the function, determining if a function associated with the type signature is stored in a cache, looking up the function in the cache when the function associated with the type signature is stored in the cache and dynamically calling the function associated with the type signature when the specialized function for the type signature is not stored in the cache.

20 Claims, 5 Drawing Sheets

OPTIMIZED EXECUTION OF DYNAMIC LANGUAGES

BACKGROUND

Dynamic languages such as PHP: Hypertext Preprocessor (PHP), Python, Ruby, and Perl have been adopted heavily for web development and applications development because they allow for high developer productivity due to their flexibility in comparison to static languages such as C, the Java® programming language, or C++. However, this flexibility typically leads to significantly slower execution of these languages over static languages.

SUMMARY

The disclosed subject matter relates to a method for optimizing execution of dynamic language code, the method including identifying a first dynamic language function call during runtime, the function call including one or more argument values for one or more arguments of the function. The method may further include calculating a type signature for the one or more argument values of the function. The method may further include determining if a function associated with the type signature is stored in a cache. The method may further include looking up the function in the cache when the function associated with the type signature is stored in the cache. The method may further include dynamically calling the function associated with the type signature when the function for the type signature is not stored in the cache. Other aspects can be embodied in corresponding systems and apparatus, including computer program products.

The disclosed subject matter also relates to a system including one or more processors and a machine-readable medium comprising instructions stored therein, which when executed by the processors, cause the processors to perform operations including identifying a first dynamic language function call during runtime, the function call including one or more argument values for the one or more arguments of the function. The operations may further include determining a type for each of the one or more argument values. The operations may further include generating a type signature for the function according to the type for each of the one or more argument values. The operations may further include identifying a function associated with the type signature. The operations may further include generating code based on the identified function, in response to the function call. Other aspects can be embodied in corresponding systems and apparatus, including computer program products.

The disclosed subject matter also relates to a machine-readable medium including instructions stored therein, which when executed by a machine, cause the machine to perform operations including identifying a first dynamic language function call during runtime, the function call including one or more argument values for the one or more arguments of the function. The operations may further include determining a type for each of the one or more argument values. The operations may further include generating a type signature for the function according to the type for each of the one or more argument values. The operations may further include determining if a function associated with the type signature is stored in a cache. The operations may further include looking up the function in the cache when the function associated with the type signature is stored in the cache. The operations may further include dynamically calling the function associated with the type signature when the function for the type signature is not stored in the cache. Other aspects can be embodied in corresponding systems and apparatus, including computer program products.

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several implementations of the subject technology are set forth in the following figures.

DETAILED DESCRIPTION

Figure 1:
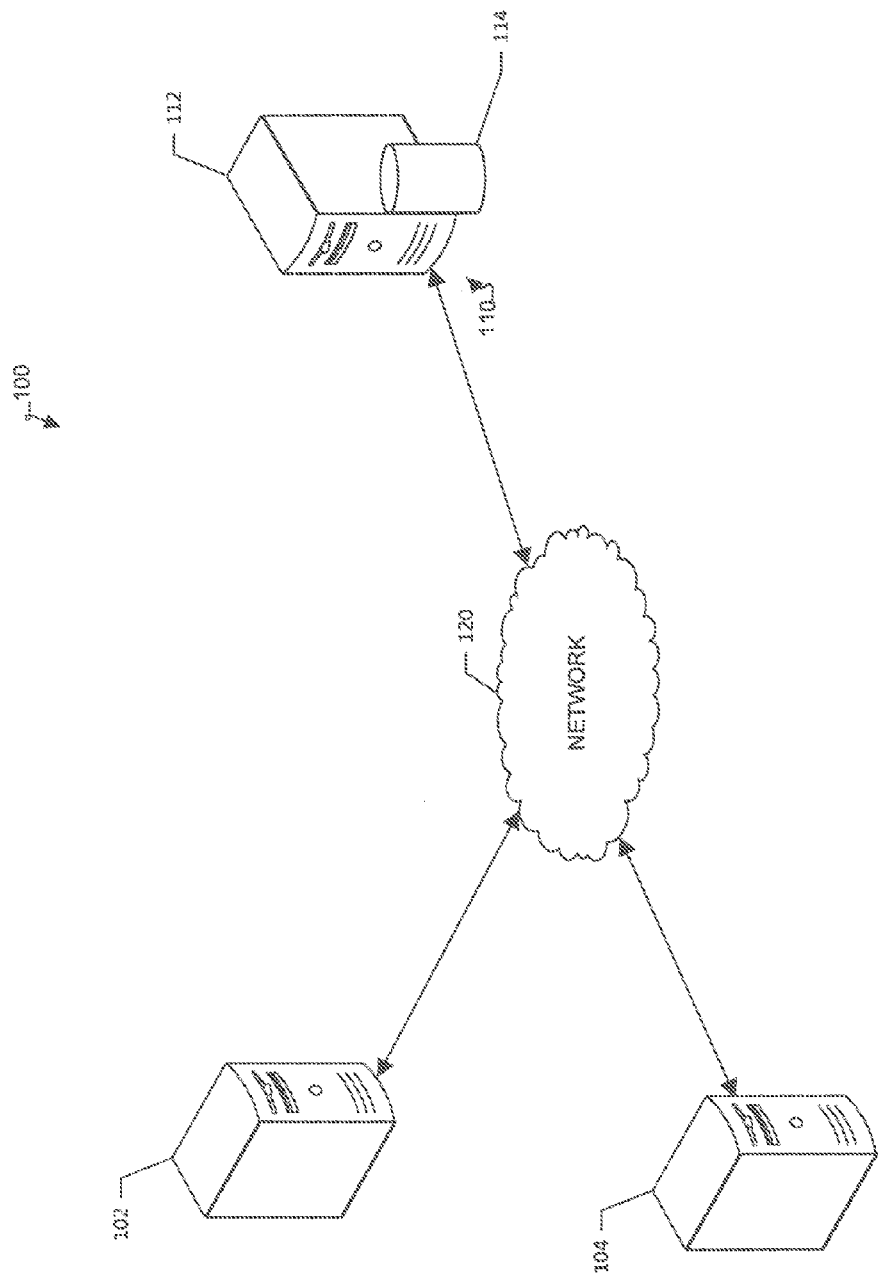
FIG. 1 illustrates an example client-server network environment, which provides for generation of specialized intermediate representation ("IR") and optimized generation of machine code at runtime.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent that the subject technology is not limited to the specific details set forth herein and may be practiced without these specific details.

Dynamic languages allow for more flexibility due to their dynamic nature. Several features of dynamic languages contribute to their productive characteristics. For example, these languages allow for runtime typing and the ability to evaluate new data as code dynamically (e.g., "eval" in PHP and JavaScript). These characteristics allow developers to write code that can be used more flexibly than static code written in static languages such as C, the Java® programming language, or C++. For example, the dynamic languages enable more flexible development practices by allowing developers to conditionally generate new executable code from existing code at runtime to handle novel data.

Typically the execution of these languages is significantly slower than that of static languages because the types of variables and functions and full scope of executable code for dynamic languages is not statically known.

Static languages may enforce compile time static typing and may not allow dynamic code execution. For these static languages, the types of functions and variables are typically known at compile time, and the full scope of executable code is usually known by the compiler. Accordingly, a static language can be translated to machine code efficiently prior to a program's execution.

In the case of a dynamic language, the full scope of the executable code is not known, and the types of many functions and variables may not be known until the moment the code is executed. For these reasons a dynamic language cannot be completely converted to machine code prior to execution. In addition, even runtime translation to machine code is often impractical for these dynamic languages because the just-in-time compilation process may itself require significant execution resources leading to diminished performance during execution. Accordingly, generating machine code efficiently prior to execution is often difficult. The need for significant execution resources for machine code translation during runtime leads to diminished performance during execution.

To facilitate more optimized machine code generation and runtime execution, methods and systems are provided for facilitating generation of specialized intermediate representation ("IR").

The present disclosure provides a method and system for optimizing execution of dynamic languages through generating machine code for a code block including condition code that allows for dynamic generation of machine code for specific functions. In certain aspects intermediate representation of code can be generated for a code block, where one or more operations may be predefined. To allow for generation of IR for an entire block while accounting for dynamic components within the code block such as functions that might not run during execution (e.g., because of a conditional loop), the IR includes a special lazy call for each conditional operation. The lazy call within the IR allows for execution of the code such that it does not compile the operation (e.g., function) unless the operation is run during execution.

The lazy call allows for the entire code block to be translated into IR, while allowing for the conditional portions of the code to be excluded from compilation unless and until the portion needs to be executed (e.g., the condition is satisfied). Thus, in some implementations, the condition portions of the call need not be compiled causing waste of resources, unless and until, the condition is satisfied. In this manner, the dynamic nature of the code is preserved, while allowing for processing of other portions of the code that are static in nature and thus can be processed and translated before run time.

Once the condition is satisfied at runtime, however, the function has to be resolved. In dynamic languages (e.g., PHP), function calls are not resolvable statically (e.g., ahead of runtime) and instead need to be resolved dynamically at runtime. In order to efficiently resolve these function calls at runtime various techniques may be employed. For example, inline caching allows for dynamically resolving function calls at runtime. Using inline caching, when a function call is conditional and resolves at runtime depending on a condition (e.g., a dynamic value of an input to the function), the logical function call is transformed to a lookup into a table of table of function pointer, and thus, dynamically looks up the function at runtime. In one example, the call to look up the function at runtime either returns the function, or throws an error if the function is not found. Inline caching further improves the dynamic function call by only calling the function once and caching the function (e.g., within a function table) once it's been called.

To further optimize the function call, specialized versions of the functions can be generated based on the type of arguments for the function. That is, instead of generating a single function call that handles all argument types, a version optimized function call that takes into account the possible argument types (e.g., the most likely argument types) for the function may be called. Once specialized function calls are generated, they can be easily mapped to machine instructions for the specific argument type. One approach is to build a polymorphic inline cache which creates a function that compares the object's argument type against a small number of previously used argument types. For each of the previously used argument types, a specialized function is provided.

For example, with respect to the following example function:

<?php
function Square($x) {return $x*$x;}
Square(10);
Square(12.0);
?>

A non-specialized implementation may generate a single version of the function Square that can handle any type for argument $x. However, the function can be optimized based on the specific type of argument $x (e.g., whether $x is an integer, as in the first call, or a float, as in the second call). By specializing the function based on the argument type, the code generated for the function can be much more efficient.

In one example, the specialization can be achieved by generating the inline cache from the polymorphic in its arguments as follows:

if ($arg→type==Int) {
    % f=Square_Int;
} else if ($arg→type==Float) {
    % f=Square_Float;
} else {
    % f=Square_General;
}

However, this would require that specialized functions are built ahead of time and can be called from the inline cache, where each time, the conditional is checked to call the correct specialized function.

To allow for dynamic specialization and further optimize the process, instead of a single function including specialized functions for the different argument types, a separate specialized function may be generated for a set of argument types of a function. In one example, a type signature may be calculated for an argument at runtime and checked dynamically. For each type signature, a specialized function may be generated separately at runtime. Once generated, each specialized function associated with the unique type signature may be stored as a separate entry in a cache (e.g., as a separate table entry in the function table). In some examples, the type signatures can be computed ahead of time and cached for later retrieval.

For example, for the above function, a type signature can be computed (e.g., a bitmask of the argument types) and checked dynamically, as follows:

typeSig= . . . ComputeTypeSignature from args . . . ;
if (typeSig==SIG0) {
    % f=FnTable["Square", 0];
} else if (typeSig==SIG1) {
    % f=FnTable["Square", 1];
} . . . {
    % f=GetFunctionPointer("Square", typeSig);
}

Where [SIG0, SIG1, . . . ], are possible type signatures for the function.

For code-generation systems where machine code replacement is possible, the signatures and FnTable values can be emitted directly as literal immediate values in the machine code (initially as sentinel values that cannot be matched, so that GetFunctionPointer is called). However, with systems such as LLVM's JIT or other systems that cannot edit the machine code once generated, we lookup SIG0 and FnTable[ ] on demand from memory, allowing them to be modified without changing the underlying machine code.

Thus, the type signature and function table entry can be looked up on demand from memory, allowing them to be modified without changing the underlying machine code. In some examples, specializations are provided for a limited set of argument types (e.g., two or three of the most common argument types for a function). In one example, type inference may be performed to determine the possible or most likely argument types for a function and specializations may be performed according to the type inference. In some examples, the number of specialized functions for each function may be limited. For example, the specialization may be limited to two specializations plus a generic function.

Using call specialization, the code of the function as well as all downstream callees of the function can be optimized.

FIG. 1 illustrates an example client-server network environment, which provides for generation of specialized intermediate representation ("IR") and optimized generation of machine code at runtime. The network environment 100 includes a number of clients 102 and 104 communicably connected to an application server 110.

Figure 2:
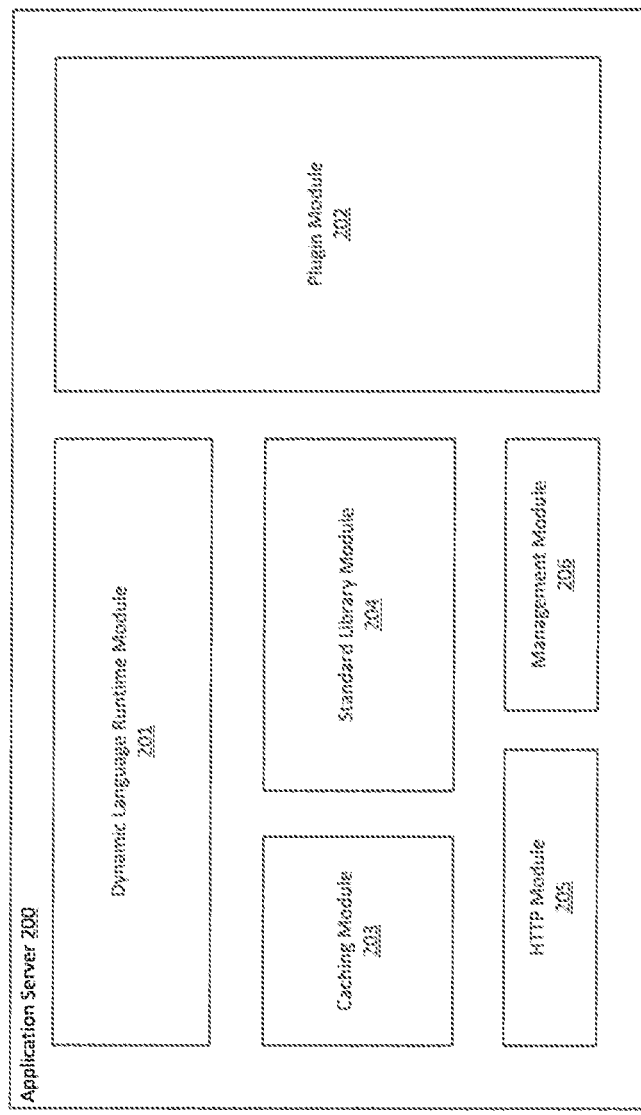
FIG. 2 illustrates an example application server for use in facilitating optimized generation of machine code at runtime.

According to some aspects, application server 110 can be any system or device having a processor, a memory and communications capability for facilitating optimized generation of machine code at runtime. FIG. 2, described in more detail below, illustrates an example application server 110.

In some example implementations, clients 102 and 104 can be any client issuing web requests to the application server 110. In the example of FIG. 1, client 102 may be a mobile client and client 104 may be a browser client (e.g., web browser). Communications between the clients 102 and 104 and server 110 may be facilitated through various communication protocols (e.g., the HTTP protocol).

In one example, the communication between application server 110 and clients 102 and 104 may be through a network 120. Network 120 can be a public communication network (e.g., the Internet, cellular data network, dialup modems over a telephone network) or a private communications network (e.g., private LAN, leased lines). The network 120 can include, for example, any one or more of a personal area network (PAN), a local area network (LAN), a campus area network (CAN), a metropolitan area network (MAN), a wide area network (WAN), a broadband network (BBN), the Internet, and the like. Further, the network 120 can include, but is not limited to, any one or more of the following network topologies, including a bus network, a star network, a ring network, a mesh network, a star-bus network, tree or hierarchical network, and the like. Further, network 120 can include, but is not limited to, any one or more of the following network topologies, including a bus network, a star network, a ring network, a mesh network, a star-bus network, a tree or hierarchical network, and the like.

FIG. 2 illustrates an example application server 200 for use in facilitating optimized generation of machine code at runtime. In one example, the application server 200 may be used as the application server 110 described above with respect to FIG. 1. In some implementations, application server 200 includes a dynamic language runtime module 201, a plugins module 202, a caching module 203, a standard library module 204, an http module 205 and a management module 206.

Runtime module 201 includes logic for facilitating optimized generation of machine code at runtime. In one example, runtime module 201 includes logic for generating specialized IR.

In one example, the plugins module 202 includes a memory for storing a set of dynamic language plugins for use during code generation and/or runtime execution. In one example, plugins stored within the plugin module 201 may, for example, provide extensions and/or additional functionality to the dynamic language. For example, the plugins may include plugins for communicating with databases such as SQL or SQL server, and/or plugins for parsing XML, and other extended functionality.

Caching module 203 facilitates storing data for facilitating optimized generation of machine code at runtime. For example, caching module 203 may include memory for storing type set and/or location sets for one or more functions, operations and/or variables generated according to various methods and processes described herein. In one example, caching module 203 may further facilitate storing per request and/or across request information for facilitating optimized generation of machine code at runtime (e.g., a page request). For example, caching module 203 may store function tables for storing specialize function code for one or more functions. In one example, the caching module may further store type signatures and/or type sets for one or more arguments of a function.

Standard library module 204 may store one or more predefined functions and/or operations for the dynamic language. In one example, the standard library module 204 includes memory for storing a wide range of built-in modules that provide access to system functionality, as well as modules that provide standardized solutions (e.g., built-in operations). For example, in some examples, the modules may provide abstractions of existing core language to provide platform neutrality.

In some examples, HTTP module 205 may include logic for responding to requests from one or more clients (e.g., clients 102 and/or 104). For example, HTTP module 205 may include logic for responding to requests for webpages. The logic may include logic for setting up a connection, communicating with one or more clients for accessing request from and/or responding to clients, etc. The HTTP module may further include information such as HTTP error codes and/or other information for communicating with one or more clients via the HTTP protocol.

Management module 206 provides operations and/or developer functionality. For example, the management module 206 may store one or more debuggers, profilers, stat counters, loggers, etc.

Figure 3:
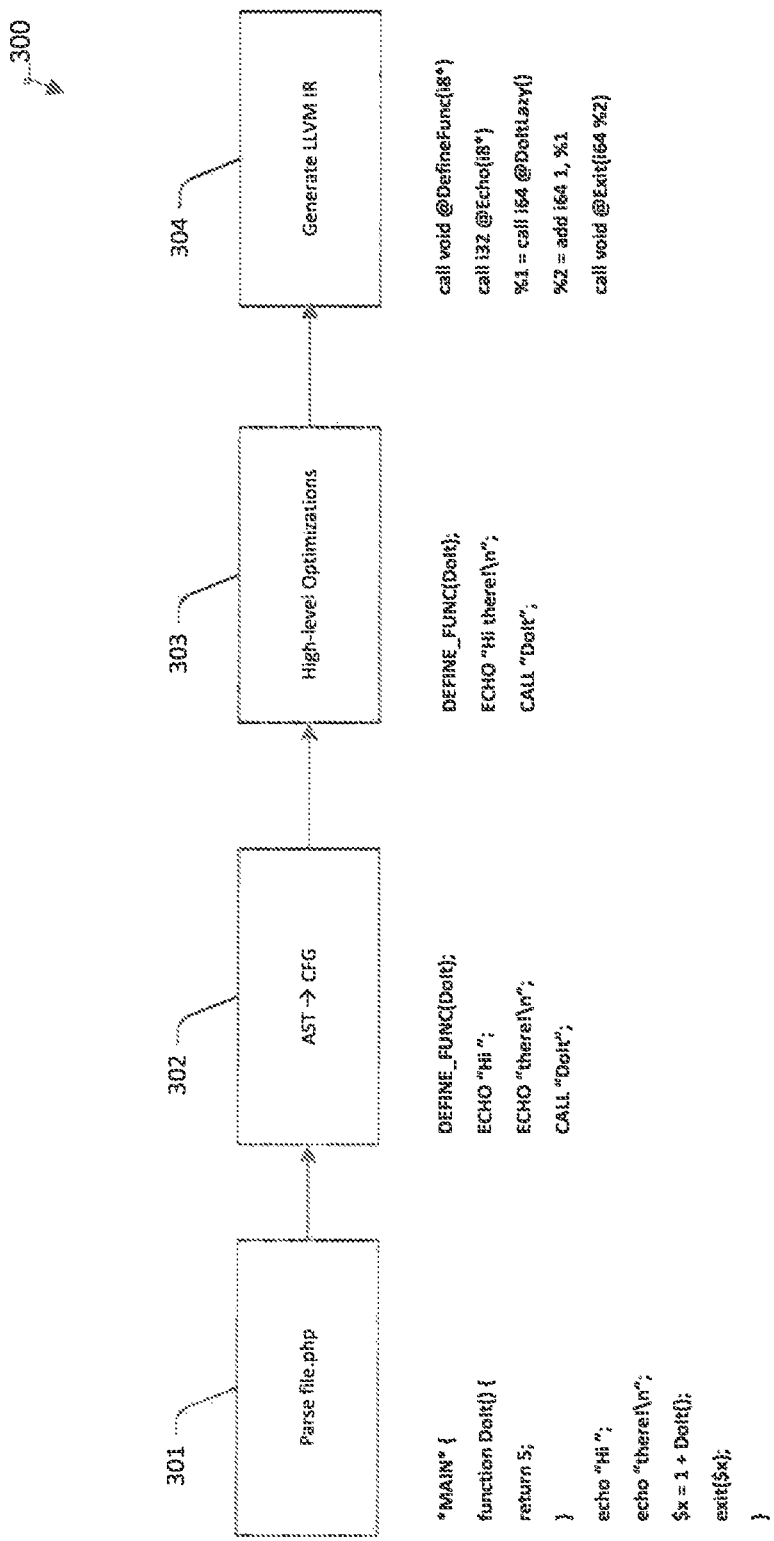
FIG. 3 illustrates a flow diagram of an example process for generating IR from a PHP code block (e.g., a function).

FIG. 3 illustrates a flow diagram of an example process 300 for generating IR from a PHP code block (e.g., a function). The use of PHP is for exemplary purposes. While the example flow diagram illustrates a PHP file, it should be understood by one of ordinary skill in the art that same or similar steps may represent generation of IR for other dynamic languages.

As shown in block 301, a code block (e.g., file) is first parsed. Here, the code block file.php is illustrated as being parsed. Parsing the code block results in generating a CFG as shown in block 302. High level optimizations are next performed on the CFG as shown in block 303 (e.g., combining ECHO "Hi" and ECHO "there!\n" into ECHO "Hi there!\n"). Next, in block 304, LLVM IR is generated from the optimized CFG. In some examples, in addition to high level optimizations of the CFG, other processes may be performed to optimize generation of IR. For example, type set and location set inferences may be performed according to processes described herein to optimize generation of IR (e.g., to allow for specialized IR based on specific types and locations of expressions with a code block such as file.php). Additionally, specialization or partial specialization of code (e.g., based on type or location inferences) may be performed. Once IR is generated, further optimizations (e.g., standard and/or traditional compiler optimizations) may be performed at the IR level.

In some examples caching may be performed to avoid re-compilation of a code block both at the file and/or function level, so that code generation need not be duplicated. In one example, one or more tables are generated to keep track of previously compiled files, functions, etc. The table(s), may be inserted into a cache (e.g., within caching module 203). For example, a function table may stored one or more functions and/or specialized functions generated during runtime. In another example, a table may store type signatures calculated for an argument and/or function.

For example, in the present example, the system may determine if file.php was previously compiled into machine code (e.g., stored within caching module 203) and has not been modified since. If so, the compiled machine code is accessed and executed. Otherwise, the file is compiled (or re-compiled) and the compiled file may be stored within the cache (e.g., within a file table within the cache module 203). Similarly, the system may determine if the function DoIt( ) within the file.php has been previously compiled and has not been modified since. If so, the compiled machine code is accessed and executed. Otherwise, the function is compiled (or re-compiled) and the compiled function may be stored within the cache (e.g., within a file table within the cache module 203).

Figure 4:
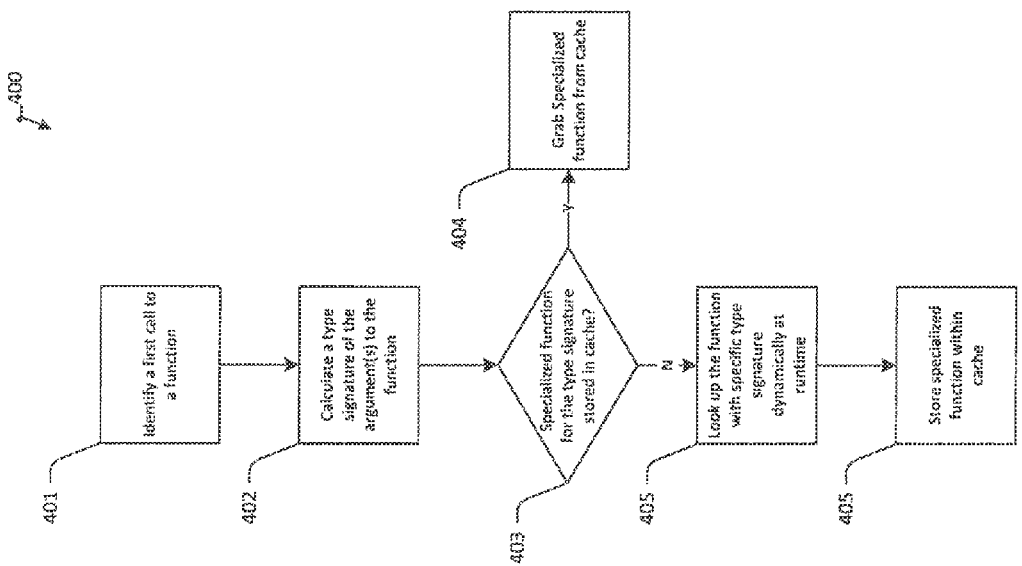
FIG. 4 illustrates a flow diagram of an example process for optimizing runtime generation of machine code by generating specialized type signature specific functions at runtime.

FIG. 4 illustrates a flow diagram of an example process 400 for optimizing runtime generation of machine code by generating specialized type signature specific functions at runtime.

In step 401, a first call to a dynamic language function is detected at runtime. In one example, the function call includes one or more argument values for each of the one or more arguments of the function, where each argument value is of a specific type.

In step 402, a type signature of the one or more argument values is calculated. In one example, a second function may be called to calculate the type signature for arguments of a function call. In one example, the type signature is calculated dynamically. In some examples, the determination introduces a delay into the process. However, in some examples, the delay may be reduced by performing type inference for one or more functions, such that the argument type for arguments of a function is known before the function is called at run-time.

Type set inferences may be performed according to various sources of type information including signature of builtins (e.g., defined return types), return types computed for user functions, argument types from call-time function specialization and rules of the language (e.g., certain operations always return certain types).

Accordingly, type sets may be generated for arguments of a function using forward data flow analysis. In one example, a control flow graph (CFG) is generated for the function. The CFG generates one or more basic blocks each comprising a set of operations. Each basic block represents a straight-line portion of the code block without any jumps or jump targets. Some operations may include one or more variables. In another example, an operation may not include a variable. The CFG may be used to infer a type and/or location set for one or more operations and/or variables of the CFG.

For example, forward dataflow analysis traverses all paths within the CFG to infer type sets for arguments of the function, according to some implementations. Type flowing includes determining, in some examples, traversing the CFG to determine the type of the operation and/or variables within the operation for each operation of the CFG can be inferred through forward dataflow analysis.

In one example, when performing forward data flow analysis for the function, the type set for each argument of the function may be set to undefined at the beginning of the forward flow analysis. Next, each operation of the CFG is analyzed to determine if types for the arguments of the function may be reduced to one or more known types (a "type set"). The forward dataflow analyses runs until convergence which occurs when the input states to all basic blocks of the CFG no longer change.

In some examples, for functions where type inference has been performed, and possible argument types are known, the process for calculating type signature can be optimized, such that the delay is minimal or not significant. In some examples, where the type inference provides only a single possible argument type for arguments of the function, the type signature calculation may be entirely eluded. However, even where the type inference provides a set of possible argument types, the bitwise operations required to compute the type signature are reduced.

Accordingly, in some examples, during step 402, a first table storing type information generated based on forward data flow analysis may be checked to determine type inference information for the function and/or arguments of the function. If the type information provides a single type for an argument, the type signature is determined as the single type. If more than one possible type is provided in the type set for an argument of the function, the type signature calculation may include determining which of the possible types the argument type is. Otherwise, if no type information is provided, the type signature calculation may include determining a type of the arguments of the function from all possible argument types.

In one example, to keep the calculated signatures compact, a simple bit mask of a specific number of bits (e.g., 4 bits) per argument may be used, to support types for all function arguments in a single, compact signature. In one example, the specialization may be limited by the number of arguments within the function (e.g., to 16 arguments). For example, for functions with more than a threshold number of arguments (e.g., 16 arguments), specialization may not be performed.

In one example, once calculated, type signatures for one or more arguments of the function may be cached and retrieved in future function calls to the same function. In some examples, when the function call is received, and before determining a type signature, in step 402, a check may be performed to determine if the argument type for a function call is previously determined and cached.

In step 403, it is determined if a specialized function for the type signature determined in step 402, is available in a cache. In one example, for each type signature calculated for a function, a specialized function may be stored as a separate entry within a function table. In some examples, the lookup includes a function lookup including an identifier of the type signature to determine if a specialized function for the specific type signature is cached. In one example, only specialized functions for a limited number of type signatures may be generated, and for the remaining type signatures a generic function may be generated and/or used during runtime. In one example, where the type signature is not a type signature associated with a specialized function, the function table look up looks for the generic function.

If, in step 403, it is determined that a specialized function (or generic function where only limited specialized functions are generated), is available in a cache, the specialized function (or generic function) is accessed and used during runtime to perform the function call.

Otherwise, in step 404, a call is made to look up or generate the specialized (or generic) function for the specific type signature calculated in step 402 dynamically at runtime. In one example, where the type signature requires a specialized function, the specialized function for the specific type signature may be generated dynamically at runtime, based on the generic function and the specific argument type associated with the type signature.

In step 405, the specialized (or generic) function is received and stored within a cache. In one example, the specialized function may then be retrieved and used when the function is called at runtime with the specific type signature.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 5:
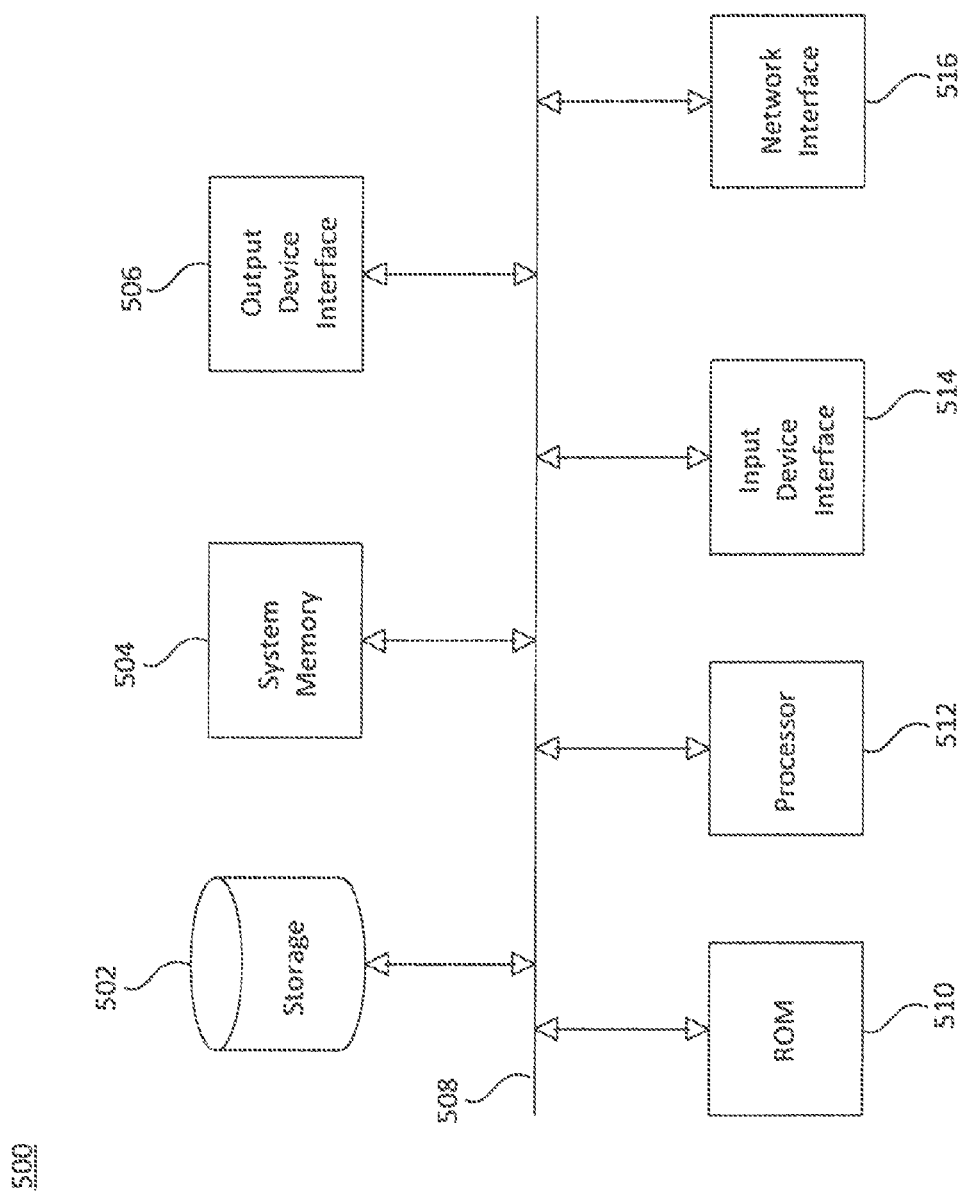
FIG. 5 conceptually illustrates an electronic system with which some implementations of the subject technology are implemented.

FIG. 5 conceptually illustrates an electronic system with which some implementations of the subject technology are implemented. Electronic system 500 can be a server, computer, phone, PDA, laptop, tablet computer, television with one or more processors embedded therein or coupled thereto, or any other sort of electronic device. Such an electronic system includes various types of computer readable media and interfaces for various other types of computer readable media. Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such a random access memory. System memory 504 stores some of the instructions and data that the processor needs at runtime. In some implementations, the processes of the subject disclosure are stored in system memory 504, permanent storage device 502, and/or ROM 510. For example, the various memory units include instructions for generation of specialized intermediate representation ("IR") and optimized generation of machine code at runtime according to various implementations. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interfaces 506 enables, for example, the display of images generated by the electronic system 500. Output devices used with output device interface 506 include, for example, printers and display devices, such as cathode ray tubes (CRT) or liquid crystal displays (LCD). Some implementations include devices such as a touchscreen that functions as both input and output devices.

Finally, as shown in FIG. 5, bus 508 also couples electronic system 500 to a network (not shown) through a network interface 516. In this manner, the computer can be a part of a network of computers (such as a local area network ("LAN"), a wide area network ("WAN"), or an Intranet, or a network of networks, such as the Internet. Any or all components of electronic system 500 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that some illustrated steps may not be performed. Some of the steps may be performed simultaneously. For example, in certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A method executed by a processor for optimizing execution of dynamic language code, the method comprising:
    identifying a first dynamic language function call during runtime, the function call including argument values for one or more arguments of the function;
    calculating a type signature for the one or more argument values of the function;
    determining if a function associated with the type signature is stored in a cache;
    looking up the function in the cache when the function associated with the type signature is stored in the cache; and
    dynamically calling the function associated with the type signature when the function for the type signature is not stored in the cache.

2. The method of claim 1, further comprising:
    receiving, in response to calling function, a function associated with the type signature.

3. The method of claim 2, further comprising:
    storing the received function associated with the type signature, generated in response to the dynamically calling the function, in the cache.

4. The method of claim 1, wherein the type signature is one of a set of type signatures of the function associated with specialized functions and wherein the function associated with the type signature is a specialized function.

5. The method of claim 1, wherein the type signature is not one of a set of type signatures of the function associated with specialized functions and wherein the function associated with the type signature is a generic function.

6. The method of claim 1, wherein the type signature comprises a bit string with a specific number of bits assigned to each of the one or more arguments of the function.

7. The method of claim 6, wherein the bits assigned to each of the one or more arguments of the function indicates the type of the argument values.

8. The method of claim 1, wherein looking up the function further comprises:
    determining if the type signature is one of a set of type signatures associated with specialized functions; and
    looking up the specialized function from the cache where the type signature is one of the set of type signatures associated with specialized functions.

9. The method of claim 8, further comprising:
    looking up a generic function from the cache where the type signature is not one of the set of type signatures associated with specialized functions.

10. The method of claim 1, wherein determining the type signature comprises:
    determining if the one or more arguments of the function are associated with a pre-determined type set; and
    determining the type signature based on the pre-determined type set for each of the one or more arguments associated with a pre-determined type set.

11. The method of claim 1, wherein the calculated type signature provides an indication of the type of each of the one or more argument values.

12. The method of claim 1, wherein the type signature includes a single bit string.

13. The method of claim 1, wherein the type signature includes a set of bit strings, each bit string indicating a type of at least one of the one or more argument values.

14. A system for optimizing execution of dynamic language code, the system comprising:
    one or more processors; and
    a machine-readable medium comprising instructions stored therein, which when executed by the processors, cause the processors to perform operations comprising:
        identifying a first dynamic language function call during runtime, the function call including one or more argument values for the one or more arguments of the function;
        determining a type for each of the one or more argument values;
        generating a type signature for the function according to the type for each of the one or more argument values;
        identifying a function associated with the type signature; and
        generating code based on the identified function, in response to the function call.

15. The system of claim 14, wherein identifying a function associated with the type signature comprises:
    determining if a function associated with the type signature is stored in a cache; and
    looking up the function in the cache when the function associated with the type signature is stored in the cache.

16. The system of claim 15, the operations further comprising:
    dynamically calling the function associated with the type signature when the function for the type signature is not stored in the cache.

17. The system of claim 14, wherein the function associated with the type signature is a specialized function generated in response to the specific type of the one or more argument values.

18. A non-transitory machine-readable medium comprising instructions stored therein, which when executed by a machine, cause the machine to perform operations comprising:
    identifying a first dynamic language function call during runtime, the function call including one or more argument values for the one or more arguments of the function;
    determining a type for each of the one or more argument values;
    generating a type signature for the function according to the type for each of the one or more argument values;
    determining if a function associated with the type signature is stored in a cache;
    looking up the function in the cache when the function associated with the type signature is stored in the cache; and
    dynamically calling the function associated with the type signature when the function for the type signature is not stored in the cache.

19. The machine readable medium of claim 18, wherein the function associated with the type signature is a specialized function generated in response to the specific type of the one or more argument values.

20. The machine-readable medium of claim 19, wherein the type signature includes a single bit string, including specific bits for each of the one or more arguments, each of the specific bits representing a value indicating the type of the argument value for an argument of the one or more arguments.

* * * * *